US011249289B2

(12) United States Patent
Bodkin et al.

(10) Patent No.: US 11,249,289 B2
(45) Date of Patent: Feb. 15, 2022

(54) SPECTRAL IMAGER AND SPECTRAL IMAGING METHOD

(71) Applicant: Bodkin Design and Engineering LLC, Wellesley, MA (US)

(72) Inventors: Andrew Bodkin, Dover, MA (US); James T. Daly, Mansfield, MA (US)

(73) Assignee: BODKIN DESIGN AND ENGINEERING LLC, Newton, MA (US)

(*) Notice: Subject to any disclaimer, the term of this patent is extended or adjusted under 35 U.S.C. 154(b) by 0 days.

(21) Appl. No.: 16/752,615

(22) Filed: Jan. 24, 2020

(65) Prior Publication Data

US 2020/0241262 A1 Jul. 30, 2020

Related U.S. Application Data

(60) Provisional application No. 62/797,149, filed on Jan. 25, 2019.

(51) Int. Cl.
*G02B 13/14* (2006.01)
*G02B 3/00* (2006.01)
*H04N 5/33* (2006.01)
*G02B 27/28* (2006.01)
*G02B 5/28* (2006.01)

(52) U.S. Cl.
CPC ........... *G02B 13/14* (2013.01); *G02B 3/0006* (2013.01); *G02B 5/281* (2013.01); *G02B 5/284* (2013.01); *G02B 27/288* (2013.01); *H04N 5/332* (2013.01)

(58) Field of Classification Search
CPC ...... G02B 13/14; G02B 3/0006; G02B 5/281; G02B 5/284; G02B 27/288; H04N 5/332
USPC .......................................... 348/164
See application file for complete search history.

(56) References Cited

U.S. PATENT DOCUMENTS

| 10,072,970 B1* | 9/2018 | Twede ................. G01J 3/0208 |
| 2005/0147134 A1* | 7/2005 | McDonald .......... G02B 26/001 372/9 |
| 2008/0079828 A1* | 4/2008 | Izawa ................ H04N 9/04559 348/294 |
| 2015/0241667 A1* | 8/2015 | Staver .................. G01J 5/0806 250/349 |

(Continued)

OTHER PUBLICATIONS

Oiknine et al. (Oct. 15, 2018) "Multi-aperture snapshot compressive hyperspectral camera," Optics Letters, vol. 43, No. 20, 4 pp.

(Continued)

*Primary Examiner* — Nguyen T Truong
(74) *Attorney, Agent, or Firm* — Lathrop GPM LLP

(57) ABSTRACT

A spectral imager includes a filter array, a pixel array, and a lenslet array therebetween. The filter array includes a plurality of filter regions. The lenslet array includes a plurality of lenslets each configured to form a respective image of the filter array on a respective one of a plurality of regions of the pixel array. The spectral imager may also include a fore-optic lens, the filter array being located between the lenslet array and the fore-optic lens. The spectral imager may also include a fore-optic lens, the filter array being located between the lenslet array and the fore-optic lens. Each of the plurality of filter regions is configured to selectively transmit radiation based on wavelength and/or polarization.

19 Claims, 7 Drawing Sheets

(56) References Cited

U.S. PATENT DOCUMENTS

| | | | | |
|---|---|---|---|---|
| 2016/0037022 A1* | 2/2016 | Matsuzaki | ........... | G02B 3/0056 |
| | | | | 348/335 |
| 2017/0276848 A1* | 9/2017 | Sinclair | .................. | G02B 5/201 |
| 2018/0081045 A1* | 3/2018 | Gylys | ..................... | G01S 17/58 |
| 2018/0364458 A1* | 12/2018 | Avila | ................. | G02B 27/0911 |
| 2019/0128507 A1* | 5/2019 | Roy | ................. | G02F 1/133555 |
| 2019/0182441 A1* | 6/2019 | Saleh | ........................ | G01J 3/04 |

OTHER PUBLICATIONS

Shanmugam (2014) "Spectral matching approaches in hyperspectral image processing," International Journal of Remote Sensing, vol. 35, No. 24, pp. 8217-8251.

* cited by examiner

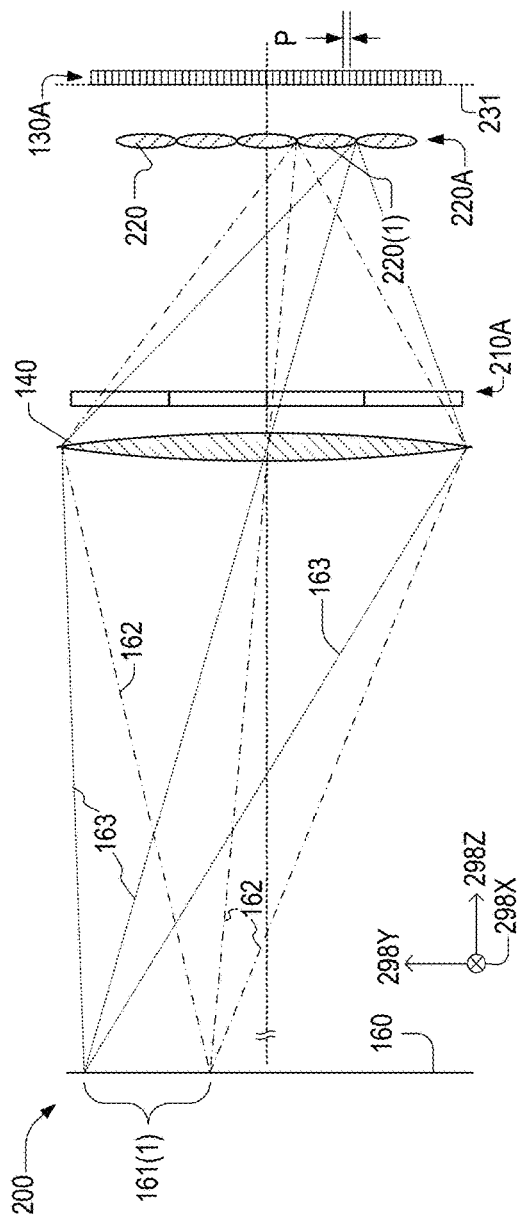
FIG. 2
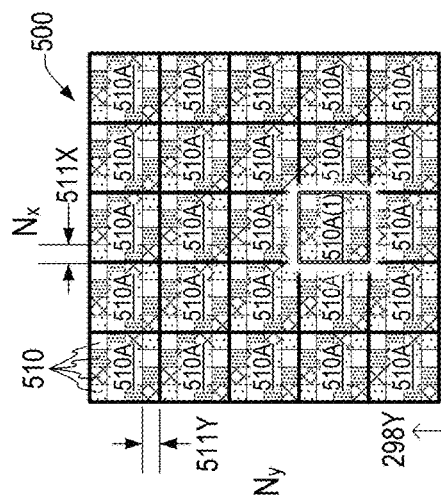
FIG. 5
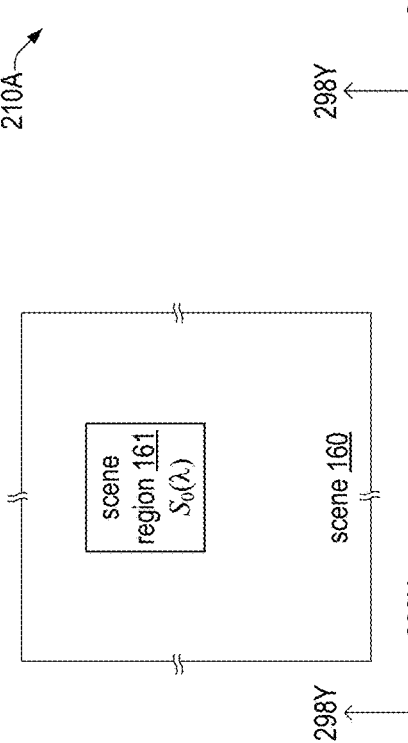
FIG. 4
FIG. 3

1000

1010
Image each of a plurality of scene regions of a scene through a filter array onto a respective one of a plurality of lenslets of a lenslet array.

1012
Image a first scene region of the plurality of scene regions.

1020
While each of the plurality of lenslets has a respective scene region imaged thereon, form, with each of the plurality of lenslets, a respective filter-image of a plurality of filter-images of the filter array at a light-sensing surface of an image sensor.

1030
Store, in a memory, a measured signal vector $S = [S_1, S_2, ..., S_M]$ generated by the image sensor in response to imaging the first scene region.

1040
Recover a spectral density $S_0$ of the first scene region by multiplying the measured signal vector $S$ by an inverse of a filter matrix $F$ having matrix elements $F_{j,k} = T_k(\lambda_j)$.

FIG. 10

SPECTRAL IMAGER AND SPECTRAL IMAGING METHOD

CROSS REFERENCE TO RELATED APPLICATIONS

This application claims priority to U.S. Provisional Application No. 62/797,149, filed on Jan. 25, 2019, the contents of which is hereby incorporated by reference in its entirety.

U.S. GOVERNMENT RIGHTS

This invention was made with government support under SBIR Contract No. W911SR-18-C-0008 awarded by the Department of Defense. The government has certain rights in the invention.

BACKGROUND

Airborne spectral imaging systems have demonstrated utility for material detection and identification. Spectral imaging includes hyperspectral and multispectral imaging. infrared hyperspectral imaging systems can operate at daytime and nighttime, and are used for example, to monitor liquid and gaseous materials and detect camouflaged, concealed, and decoy targets.

Some spectral imaging systems operate similar to a dispersive spectrometer by spatially separating spectral bands of incident illumination with dispersive optical elements. Such dispersive systems generally have limited signal strength due to high dispersion. And slit scan devices require time to build up spatial data through multiple images Other spectral imaging systems operate similar to a Fourier-Transform Spectrometer by evaluating the interferograms in a temporal sequence and converting to spectra. Such Fourier transform systems can achieve high spectral resolution with good signal strength but at the expense of added collection time.

SUMMARY OF THE EMBODIMENTS

Embodiments of spectral imagers disclosed herein overcome these deficiencies. In embodiments, the spectral imager includes a fore-optic that can be easily interchanged making it applicable to various focal length optics, telescopes, and microscopes. The disclosed spectral imager better than scanned systems such as tunable filters and slit-scan spectrometers because it will have higher signal-to-noise and can collect the entire data-cube instantly. Embodiments disclosed herein overcome the spatial miss-alignment plaguing filter arrays laid directly on the focal plane.

In a first aspect, a spectral imager includes a filter array, a pixel array, and a lenslet array therebetween. The filter array includes a plurality of filter regions. The lenslet array includes a plurality of lenslets each configured to form a respective image of the filter array on a respective one of a plurality of regions of the pixel array. The spectral imager may also include a fore-optic lens, the filter array being located between the lenslet array and the fore-optic lens. The filter array may be located at or near the aperture of the imaging lens. Each of the plurality of filter regions is configured to selectively transmit radiation based on wavelength and/or polarization.

In a second aspect, a spectral imaging method includes imaging each of a plurality of scene regions of a scene onto a respective one of a plurality of lenslets of a lenslet array. A filter array being located between the scene and the lenslet array. The method also includes, while each of the plurality of lenslets has a respective scene region imaged thereon, forming, with each of the plurality of lenslets, a respective filter-image of a plurality of filter-images of the filter array at a light-sensing surface of an image sensor.

BRIEF DESCRIPTION OF THE FIGURES

FIG. 2 is a schematic cross-sectional view of the spectral imager of FIG. 1 imaging a scene region onto a lenslet, in an embodiment.

FIG. 3 illustrates scene imaged by the spectral imager of FIG. 2, in an embodiment.

FIG. 4 is a schematic of a filter array of the spectral imager of FIG. 2, in an embodiment.

FIG. 5 is schematic of a tiled filter-array image formed by a lenslet array of the spectral imager of FIG. 2, in an embodiment.

FIG. 10 is a flowchart illustrating a spectral imaging method that may be implemented by the spectral imager of FIG. 9, in an embodiment.

DETAILED DESCRIPTION OF THE EMBODIMENTS

Embodiments of spectral imagers and spectral imaging methods disclosed herein have many advantages over existing methods. First, certain embodiments include a staring system, which can integrate much longer than scanned systems, providing at least an order of magnitude improved signal-to-noise. Second, certain embodiments are a snapshot system, may be implemented on handheld or unstable platforms and can produce video rate data-cubes. Certain embodiments are designed so that a fore-optic can be easily interchanged making it applicable to various focal length optics, telescopes, and microscopes.

Embodiments disclosed herein overcome the spatial miss-alignment plaguing filter arrays laid directly on the focal plane. Typically, an array of 6×6 filters will be repeatedly patterned over a focal plane array. Unfortunately, each pixel is staring at a different point in space so they are not measuring the spectrum of the same point on the object in the field. It is also very difficult to produce the micro-filter arrays that cover the focal plane array, and it is difficult to change passbands, requiring the development of an entirely new array.

Embodiments disclosed herein overcome the short comings of multi-lens imagers, for example, where a 6×6 array of lenses is placed in front of the focal plane, each fitted with a filter. The chief disadvantage of such a multi-lens design is that it is very difficult to change out lenses, and hard to make compatible with a cold shield.

Embodiments disclosed herein also overcome short comings of the HyperPixel array (doi.org/10.1117/12.818929) because they are extremely compact and have spatially correlate cross talk, similar to a mosaic filter multispectral imager. These embodiments are also better than scanned systems such as tunable filters and slit-scan spectrometers because they have higher signal-to-noise and no temporal distortions, such as motion blur or spectral mismatch.

Figure 1:
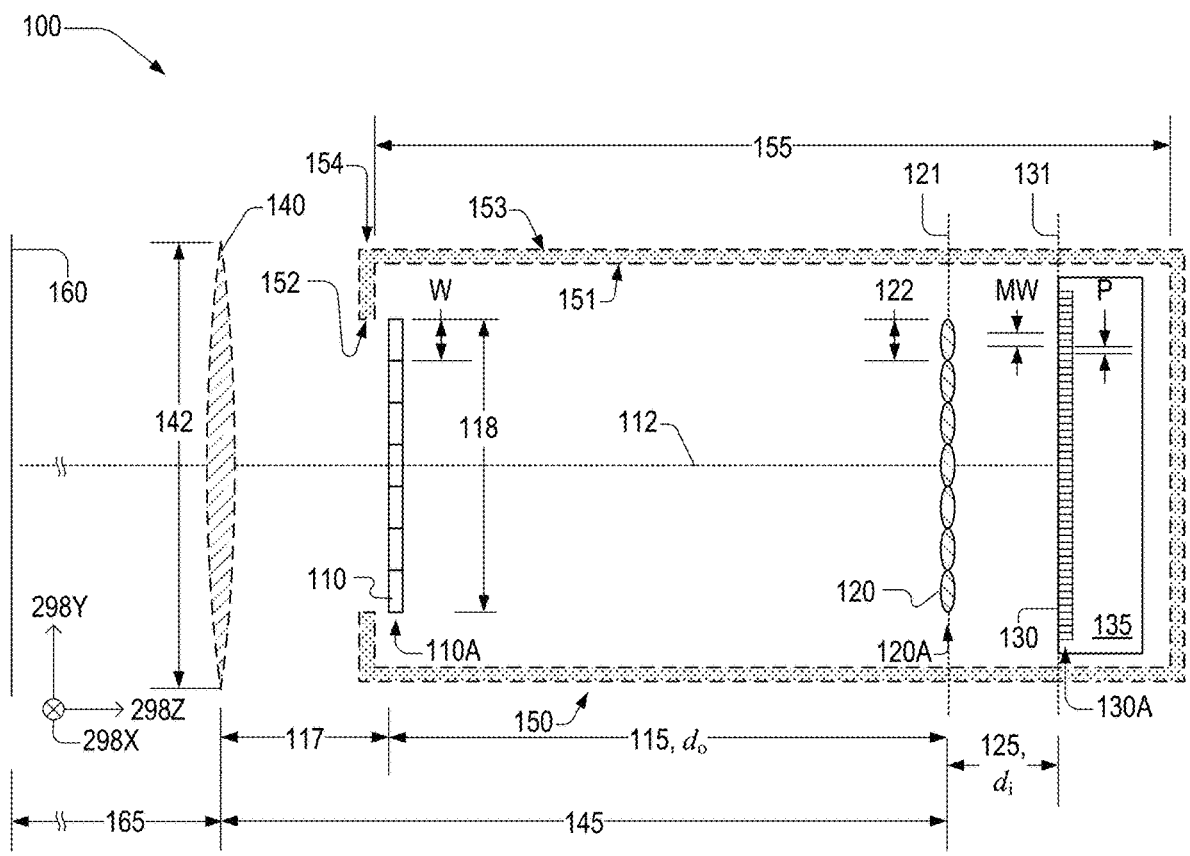
FIG. 1 is a schematic cross-sectional view of a spectral imager, in an embodiment.

FIG. 1 is a schematic cross-sectional view of a spectral imager 100, which includes a filter array 110A, a pixel array 130A, and a lenslet array 120A therebetween. The cross-sectional view of FIG. 1 is parallel to a plane, hereinafter the y-z plane, formed by orthogonal directions 298Y and 298Z, which are each orthogonal to direction 298Z. Herein, the x-y plane is formed by orthogonal directions 298X and 298Y, planes parallel to the x-y plane are referred to as transverse planes, and directions 298X and 298Y are referred to as transverse directions. Unless otherwise specified, heights of objects herein refer to the object's extent in direction 298Z, or a direction 180° opposite thereto.

In embodiments, spectral imager 100 includes a cold shield 150, which has an interior surface 151, an exterior surface 153, and an intermediate surface 152 therebetween that forms a cold stop 154, which is an aperture in cold shield 150. Cold shield 150 at least partially encloses lenslet array 120A and pixel array 130A. In embodiments, filter array 110A is within cold stop 154. Intermediate surface 152 may include a flange for securing filter array 110 in cold stop 154. Cold shield 150 may be part of, or thermally coupled to, a cryostat.

FIG. 1 denotes an axis 112, which is perpendicular to respective regions of filter array 110A, lenslet array 120A, and pixel array 130A. Filter array 110A includes a plurality of filter regions 110. In embodiments, filter array 110A has a filter-array pitch W in at least one transverse direction. Pixel array 130A includes a plurality of pixels 130 spaced by a pixel pitch P in at least one transverse direction.

Each filter region 110 may be a respective spectral filter (or a respective region of a common spectral filter) and/or a polarization filter such each filter region 110 selectively transmits radiation based on wavelength and/or polarization. For example, each filter region 110 may transmit a different type of polarization, such as linear (horizontal, vertical, diagonal) and circular (left-hand circular, right-hand circular).

Lenslet array 120A includes a plurality of lenslets 120 each configured to form a respective image of filter array 110A on a respective region of pixel array 130A. A lenslet 120 may be, or include, a Fresnel lens. Each of the respective images is characterized by a magnification $\mathcal{M}$ such that the image of a filter region 110 has width $\mathcal{M} \cdot W$ in at least one transverse direction. In embodiments, pixel pitch P is less than or equal to width $\mathcal{M} \cdot W$, such that pixel array 130A adequately samples images of filter array 110A. Each lenslet 120 has a lenslet width 122, which, in embodiments, is less than or equal to width M·W such that a region of scene 160 sampled by a lenslet 120 is filtered by each filter region 110 of filter array 110A.

In embodiments, filter array 110A includes an $M_x \times M_y$ array of M filter regions 110, where $M_x$ and $M_y$ are integers, $M_x = M_y$ or $M_x \neq M_y$, and the product $M_x M_y = M$. Each of $M_x$ and $M_y$ may be integers in the range of three and twenty. Each filter region 110(k) has a respective transmittance spectrum $T_k(\lambda)$, where positive integer k≤M. In embodiments, transmittance spectra $T_{1-M}(\lambda)$ span a wavelength range $A_{min}$ to $A_{max}$ such that for any wavelength $\lambda_1$ between $\lambda_{min}$ to $\lambda_{max}$, at least one filter region 110 of filter array 110A has a transmittance $T(\lambda_1) > 0.01$ In embodiments, $\lambda_{min} = 7$ µm, and $\lambda_{max} = 12.5$ µm for thermal imaging.

In embodiments, transmittance spectra $T_{1-M}(\lambda)$ are non-orthogonal, such that each transmittance spectrum $T_m(\lambda)$ partially overlaps with at least one other transmittance spectrum $T_n(\lambda)$ in a wavelength interval $\Delta\lambda$ in which both the minimum value of both $T_m(\lambda)$ and $T_n(\lambda)$ in wavelength interval $\Delta\lambda$ exceed a threshold transmittance value $T_{min}$. In embodiments, threshold transmittance value $T_{min}$ is between 0.01 and 0.10, for example, $T_{min}$ may equal 0.01. In embodiments, transmittance spectra $T_{1-M}(\lambda)$ are orthogonal. Non-orthogonal filter regions 110 allow more radiation to pass so the signal is stronger than with orthogonal (e.g. narrow-band) filters, and also enables the number of reconstructed spectral bands can exceed the number of filter regions M.

Each filter region 110 may effect its transmittance spectrum $T_k(\lambda)$ according to one of several filtering mechanisms including absorption, reflection, and interference. For example, a filter region 110 may be, or include, one of a multi-layer thin-film filter, an etalon filter, at least one wire grid, an absorptive filter, a reflective filter, and a metamaterial filter.

In embodiments, one or more filter regions 110 include a metasurface, such as a Huygens metasurface. The metasurface may have a unit cell dimension that is less than one-half a wavelength corresponding to a transmittance maximum of transmittance spectrum $T_k(\lambda)$. One advantage of such filters is that an entire metasurface array can be fabricated in a single lithography step rather than multiple steps that is typically needed for an array of Fabry-Perot etalons. Another advantage of this approach is that, in embodiments, each filter passes more radiation so the signal is stronger than with a single narrow bandpass filter.

In embodiments, filter array 110A is a single wedged etalon, or at least two wedged etalons (stacked or side-by-side) that, by virtue of its position-dependent thickness, has a position-dependent transmittance spectrum. The wedged etalon may increase (linearly, for example) in thickness in at last one of directions 298X and 298Y. Filter array 110A may include an array of adjoining Fabry-Perot resonators each having one of a plurality of thicknesses between two parallel surfaces. In embodiments, filter array 110A includes at least two spectral filters having non-uniform thickness (stacked or side-by-side) that, by virtue of their position-dependent thickness, have position-dependent transmittance spectra. The spectral filter may be a multilayer interference filter that has a spatially-varying transmittance spectrum, for example, by virtue of having one or more layers that have a spatially non-uniform total thickness. The thickness may vary, e.g., linearly, in one or more transverse directions.

In embodiments, pixel array 130A is a component of an image sensor 135 of spectral imager 100. Image sensor 135 may be a complementary metal-oxide-semiconductor (CMOS) image sensor. In embodiments, $\lambda_{min}$ and $\lambda_{max}$ are in, and image sensor 135 is sensitive to, one or more of the following electromagnetic wavelength ranges: visible (0.40-0.75 μm), near-infrared (0.75-1.4 μm), short-wavelength infrared (1.4-3.0 μm), mid-wavelength infrared (3-8 μm), and long wavelength infrared (8-15 μm).

In embodiments, image sensor 135 includes a spectral-filter array, wherein each of a plurality filters of the spectral-filter array is aligned to a respective pixel of the pixel array and filters illumination incident on the pixel according to the spectral filter's transmittance spectrum. The spectral-filter array may be a Bayer array.

In embodiments, image sensor 135 lacks such a filter array, as filter array 110 imaged onto pixel array 130A performs said function. In embodiments, filter array 110 is removably secured in cold stop 154 such that a user of spectral imager can choose filter array 110 from among many candidate filter arrays having different respective transmittance functions.

In embodiments, spectral imager 100 includes a fore-optic 140. Filter array 110A is located between lenslet array 120A and fore-optic 140. Fore-optic 140 and lenslet array 120A are separated by an axial distance 145 along axis 112. Axial distance 145 is the geometric path length traveled by an axial ray through fore-optic 140 between fore-optic 140 and the lenslet array 120A. In embodiments, cold stop 154 of cold shield 150 functions as an aperture stop of a fore-optic imaging system that includes fore-optic 140 and pixel array 130A. In embodiments, cold stop 154 functions as a field stop of a lenslet imaging system that includes lenslet array 120A and pixel array 130A. In embodiments, filter array 110A is within cold stop 154, such that when cold stop 154 is an aperture stop, all illumination entering the fore-optic imaging system and the lenslet imaging system is filtered by filter array 110A.

In embodiments, filter array 110A may be coplanar with fore-optic 140 (e.g., within fore-optic 140) or immediately in front or behind fore-optic 140. In such embodiments, fore-optic 140 may function as the aperture stop of the fore-optic imaging system and a field stop of the lenslet imaging system.

FIG. 1 denotes a scene 160 located at a distance 165 from fore-optic 140. In a use scenario, distance 165 is far greater than axial distance 145, such that distance 165 corresponds to an object distance that is effectively infinite. In embodiments, axial distance 145 equals focal length $f_2$ of fore-optic 140, such that fore-optic 140 images scene 160 to a lenslet plane 121 which is coplanar with lenslet array 120A. Lenslet array 120A spatially samples the image of scene 160.

In embodiments, each lenslet 120 is configured to form a respective image of filter array 110A on pixel array 130A. Filter array 110A and lenslet array 120A are separated by a distance 115 in direction 298Z. Filter array 110A and pixel array 130A are separated by a distance 125 in direction 298Z. Each lenslet 120 has a focal length $f_1$. In embodiments, distance 115, distance 125, and focal length $f_1$ satisfy the Gaussian lens formula $1/d_o + 1/d_i = 1/f_1$, where distance 115 equals object distance $d_o$ and distance 125 equals image distance $d_i$. In embodiments, focal length $f_1$ is between 0.5 millimeters and 2 millimeters.

Cold shield 150 has an interior length 155, which in part determines at least one of distances 115 and 125. For example, the sum of distances 115 and 125 may be less than interior length 155. In embodiments, interior length 155 is between twenty and fifty millimeters.

Lens 140 has a clear aperture 142 ($D_{142}$), which is a diameter when fore-optic 140 is circular. In embodiments, clear aperture 142, distance 145 ($z_{145}$), and lenslet width 122 ($D_{122}$) are configured such that diameter of the diffraction limited spot $$D_{spot} = \frac{2c_1 \lambda_{min} z_{145}}{D_{142}}$$

formed by fore-optic 140 is equal to or greater than width 122, such that the image of scene 160 at plane 121 is adequately sampled, which contributions to higher spatial resolution of spectral imager 100. For example, $D_{spot} \geq D_{122}$. In the expression for $D_{spot}$, $c_1 = 1.22$ when fore-optic 140 and cold stop 154 are circular, and $c_1 = 1$ when lens 140 and cold stop 154 are square.

FIG. 1 illustrates filter array 110A on the image side of fore-optic 140, that is, between fore-optic 140 and pixel array 130A. In embodiments, filter array 110A is on the object side of fore-optic 140, such that fore-optic 140 is between filter array 110A and pixel array 130A. In either embodiment, fore-optic 140 and filter array 110A are separated by an axial distance 117. In embodiments, distance 117 (hereinafter also $d_{117}$) is less than a focal length $f_2$ of fore-optic 140 to increase the fraction illumination from scene 160 incident on lens 140 that is also is transmitted by filter array 110A. For similar reasons, when filter array 110A may be on image side of fore-optic 140 and have a width 118 that exceeds $D_{142}(f_2 - d_{117})/f_2$.

In embodiments, spectral imager 100 includes no wavelength-separating optical element between lenslet array 120A and pixel array 130A. Example of wavelength-separating optical elements include dispersive optical elements, such as a prism, and diffractive elements, such as a diffraction grating. Filter array 110A makes such optical elements unnecessary.

In embodiments, spectral imager 100 includes fore-optic 140 and its configuration satisfies two imaging equations corresponding to the aforementioned fore-optic imaging system and the lenslet imaging system. In the fore-optic imaging system, distance 165, distance 145 and focal length $f_2$ satisfy the Gaussian lens formula. Distance 145 may equal focal length $f_2$. In the lenslet imaging system, distances 115, 125, and focal length $f_1$ satisfy the imaging equation. Herein, such embodiments are referred to as dual-imaging embodiments, as fore-optic 140 images scene 160 onto lenslet plane 121 while lenslet array 120A images filter array 110A onto an image plane 131. In embodiments, image plane 131 is coplanar with a light-sensing surface of image sensor 135. Herein, light refers to electromagnetic radiation, while includes, but is not limited to, ultraviolet, visible, and infrared electromagnetic radiation.

In embodiments, lenslet array 120A includes an $N_x \times N_y$ array of N lenslets 120, where $N_x$ and $N_y$ are integers, $N_c = N_y$ or $N_x \neq N_y$, and the product $N_x N_y = N$.

In dual-imaging embodiments, each of the N lenslets 120 images filter array 110A onto pixel array 130A as a lenslet-array image, which is an $N_x \times N_y$ tiling of filter array 110A. Simultaneously, fore-optic 140 forms an image of scene 160 at lenslet plane 121, such that lenslet array 120A spatially samples the image of scene 160. Each spatial sample is spectrally filtered by filter array 110A, such that the signal that reaches pixel array 130A contains spectral content of the spatial sample. Accordingly, the dual-imaging embodiments enables spectral imager 100 to form a spectral image of scene 160, as further illustrated below in FIGS. 2-5. FIGS. 2-5 are best viewed together in the following description.

FIG. 2 is a schematic cross-sectional view of a spectral imager 200, which is an example of spectral imager 100 in a dual-imaging configuration. Spectral imager 200 includes fore-optic 140, a filter array 210A, a lenslet array 220A, and pixel array 130A, and is configured to capture a spectral image of scene 160. Pixel array 130A is located at image plane 231, which is an example of image plane 131.

Filter array 210A is a four-by-four array of filters 210(1-16), and is an example of filter array 110A. Lenslet array 220A is a five-by-five array of lenslets 220, and is an example of lenslet array 120A. Each filter 210 is an example of filter region 110. Each lenslet 220 is an example of lenslet 120. FIG. 2 denotes one of lenslets 220 as lenslet 220(1).

FIG. 3 illustrates scene 160 in a transverse plane. Scene 160 includes a scene region 161(1), which has a spectral density $S_0(\lambda)$ in wavelength range $\lambda_{min}$ to $\lambda_{max}$. FIG. 4 is a schematic of filter array 210A. Each filter 210(k) has a respective transmittance spectrum $T_k(\lambda)$, where index k ranges from one to sixteen. In an embodiment, each filter 210(k) is a bandpass filter and each transmittance spectrum $T_k(\lambda)$ has a respective passband $B_k$ is centered at a respective wavelength $\lambda_k$, FIG. 5 is schematic of a tiled image 500, which is a five-by-five array of images 510A formed by lenslet array 220A at image plane 231. In embodiments, tiled image 500 is a tessellation of images 510A. Each image 510A is an image of filter array 210A, and includes a plurality of sub-images 510(1-16), each of which is an image of a respective filter 210(1-16). In the example of FIG. 5, M=16 and $N_x=N_y=5$. Each sub-image 510 has dimensions 511X and 511Y, each of which may equal an integer multiple of pixel pitch P such that each pixel 130 receives illumination corresponding to a single transmittance spectrum $T_k(\lambda)$. For example, each of dimensions 511X and 511Y equals pixel pitch P. In embodiments, filter array 210A and pixel array 130A are aligned such that each sub-image 510 is centered on a respective pixel 130, or an array of pixels 130. FIG. 5 denotes one of images 510A as image 510A(1), which is formed by lenslet 220(1).

FIG. 2 illustrates fore-optic 140 imaging scene region 161(1) onto lenslet 220(1). For example, fore-optic 140 images rays 162 propagating from the bottom of scene region 161 to the top of lenslet 220(1). Similarly, fore-optic 140 images rays 163 propagating from the top of scene region 161(1) to the bottom of lenslet 220(1).

Recall that lenslet 220(1) forms image 510A(1) of filter array 210A at image plane 231. Image 510A includes sixteen sub-images 510(1-16) each corresponding to a respective filter 210(1-16). Since the illumination incident on lenslet 220(1) is from scene region 161(1), the scene spectral density $S_0(\lambda)$ of scene region 161 at wavelength $\lambda_k$ determines the illumination amplitude of each of the sixteen sub-images 510.

Each filter 210(k) has a respective transmittance spectrum $T_k(\lambda)$ where, in embodiments, where $\lambda_{min} \leq \lambda \leq \lambda_{max}$. In the following description, $S(\lambda)$ denotes the signal measured at pixel array 130A. The signal measured through the $k^{th}$ filter is given by equation (1) and the total measured signal is given by equation (2).

$$S_k(\lambda) = \int_{\lambda_{min}}^{\lambda_{max}} T_k(\lambda) \cdot S_0(\lambda) d\lambda \tag{1}$$

$$S(\lambda) = \Sigma_{i=0}^M S_i(\lambda). \tag{2}$$

Equations (1) and (2) may be expressed in matrix notation as shown in equation (3) where measured signal vector S and input signal vector $S_0$ are column vectors of equation (4), where filter matrix F is an L×M matrix.

$$S = F \cdot S_0, \tag{3}$$

$$S = \begin{bmatrix} S_1 \\ S_2 \\ S_3 \\ \vdots \\ S_M \end{bmatrix}, S_0 = S_0(\lambda), \lambda_{min} \leq \lambda \leq \lambda_{max} \tag{4}$$

Equation (5) defines matrix elements of filter matrix F, where index i ranges from 1 to M, index j ranges from 1 to L, and $\lambda_{min} \leq \lambda_j \leq \lambda_{max}$. In embodiments, L exceeds M such that the number of wavelengths L in the recovered spectral density exceeds the number of filter regions M of filter array 110A.

$$F_{j,k} = T_k(\lambda_j) \tag{5}$$

Scene spectral density $S_0$ may then be recovered by multiplying both sides of equation (3) by the inverse of filter matrix F, namely as shown in equation (6).

$$F^{-1} \cdot S = F^{-1} \cdot F \cdot S_0 = S_0 \tag{6}$$

The elements of matrix F may be obtained by measuring the transmittance of each filter region 110 at multiple wavelengths, which may include wavelengths $\lambda_{1-M}$. From this, the elements of inverse matrix $F^{-1}$ are calculated.

Per equation (6), the number of wavelength samples in the recovered spectral density may equal the number of filter regions M. In embodiments, the recovered spectral density is reconstructed the original spectrum from a filter array 110 that includes fewer than M filter regions. For example, if we reduce from 6×6 ($M_x=M_y=6$) to 4×4 or 3×3, we can still mathematically recover the complete M=36 wavelength spectrum. The advantage of this is that when, in an embodiment, pixel array 130 is a 640×512 focal plane array, a 6×6 filter array offers 106×85 spatial resolution but 4×4 or 3×3 filter arrays offer improved spatial resolutions of 160×128 and 213×170, respectively. For such embodiments, equation (1) is replaced by equation (7), filter operator $\phi_k(\lambda)$ has dimensions q×M instead of M×M, where q<M. Equation (7) written in matrix notation is $S=\Phi \cdot S_0$.

$$S_k(\lambda) = \int_{\lambda_{min}}^{\lambda_{max}} \phi_k(\lambda) \cdot S_0(\lambda) d\lambda \tag{7}$$

In this formulation, the original signal, scene spectral density $S_0$, may be recovered using at least one of compressive sensing recovery algorithms, solvers, and methods. These include: basis pursuit, Orthogonal Matching Pursuit (OMP), Iterative Hard Thresholding (ITH), Single Iterative Reconstruction (SIRA), $\ell_1$ minimization, and a two-step iterative shrinkage/thresholding (TwIST) solver.

Figure 6:
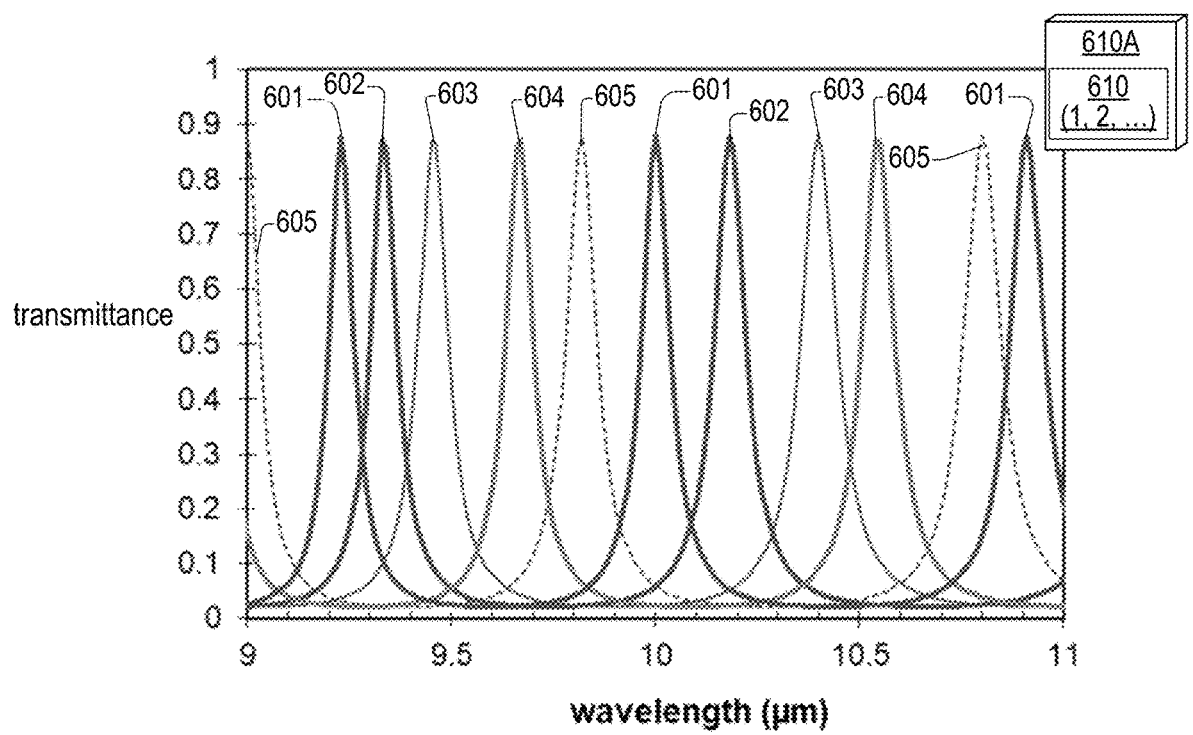
FIG. 6 is a plot of transmittance spectra of selected filters of a filter array in an embodiment of the spectral imager of FIG. 1.

FIG. 6 is a plot of transmittance spectra of selected filters of a filter array 610A, which is an example of filter array 110A. Filter array 610A includes thirty-six spectral filters 610. FIG. 6 includes a plurality of transmittance spectra 601-605 of respective filters 610 of filter array 610A. Filter array 610A may be represented by a filter matrix F per equation (5), where each of transmittance spectra 601-605, or down-sampled versions thereof at wavelengths $\lambda_{1-M}$, correspond to respective instances of $T_i(\lambda)$.

Figure 7:
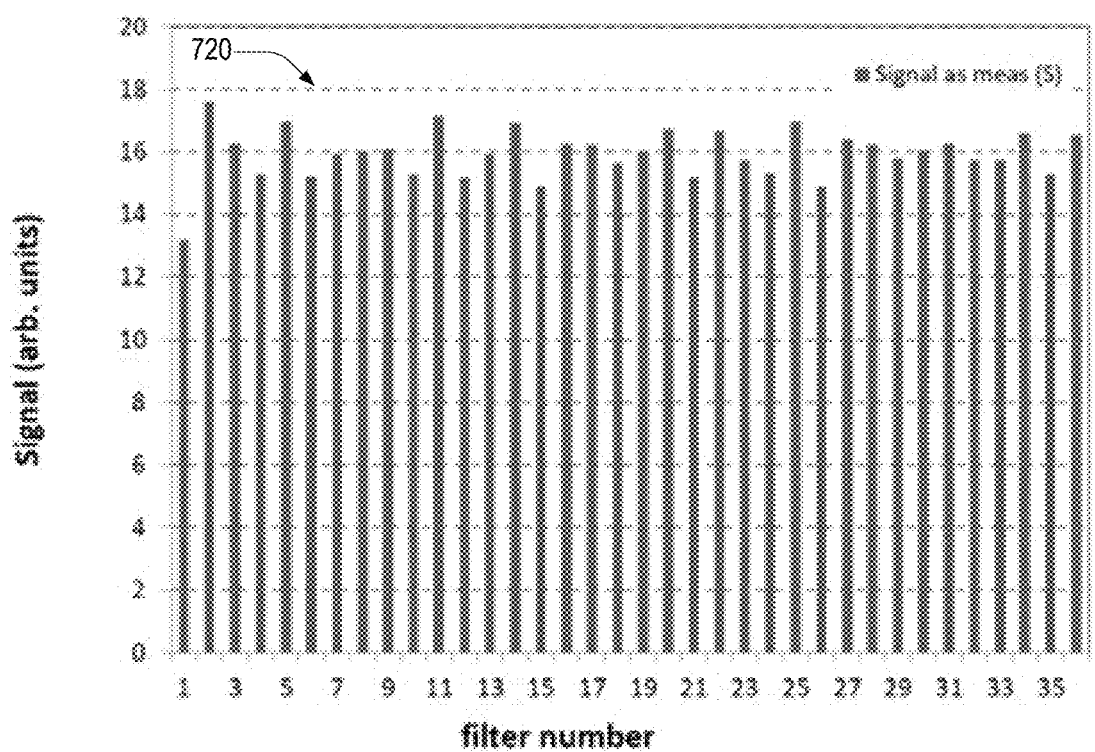
FIG. 7 is a plot of measured signal strengths received from each of a plurality of filters of the filter array of FIG. 6 functioning as the filter array of the spectral imager of FIG. 2.
Figure 8:
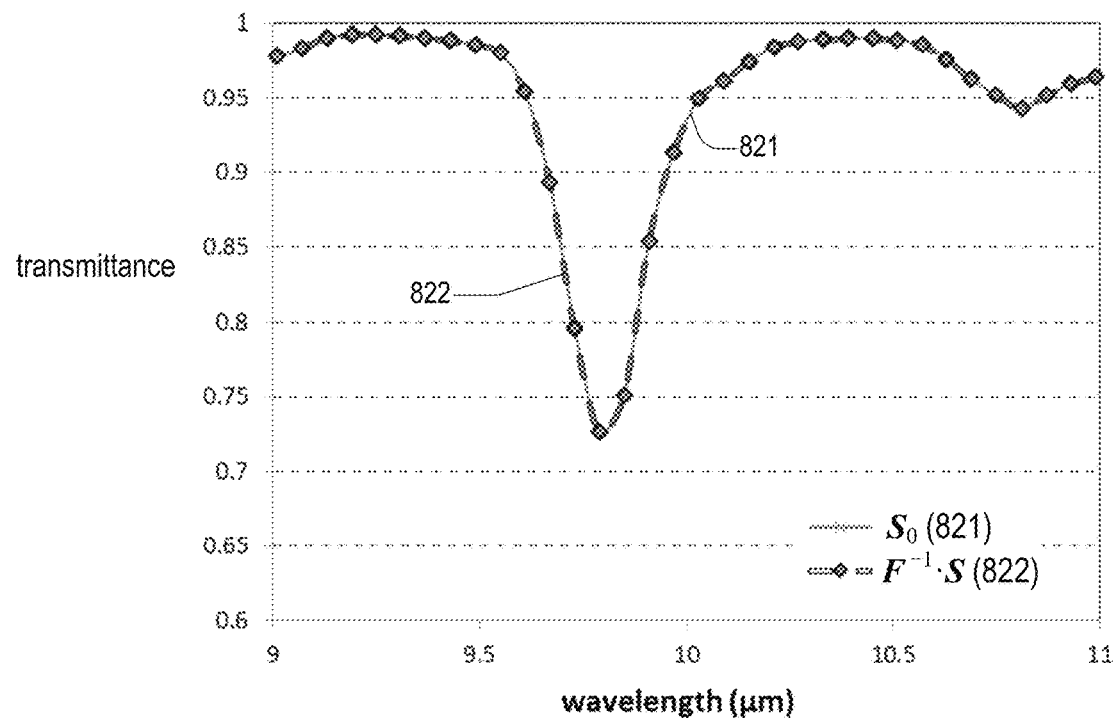
FIG. 8 graphically depicts a recovered spectrum computed from the measured signal strengths of FIG. 7 and the transmission spectra of FIG. 6, in an embodiment.

FIG. 7 graphically depicts a measured signal 720 received from each of a plurality of filters of filter array 610A functioning as filter array 210A in spectral imager 200. Measured signal 720 is an example of measured signal vector S. Taking the inverse of the filter matrix, $F^{-1}$ corresponding to filter array 610A measured signal 720 yields recovered input signal 822, shown in FIG. 8 with a diamond and outlined-dash curve. Recovered input signal 822 matches which matches actual input signal 821.

Figure 9:
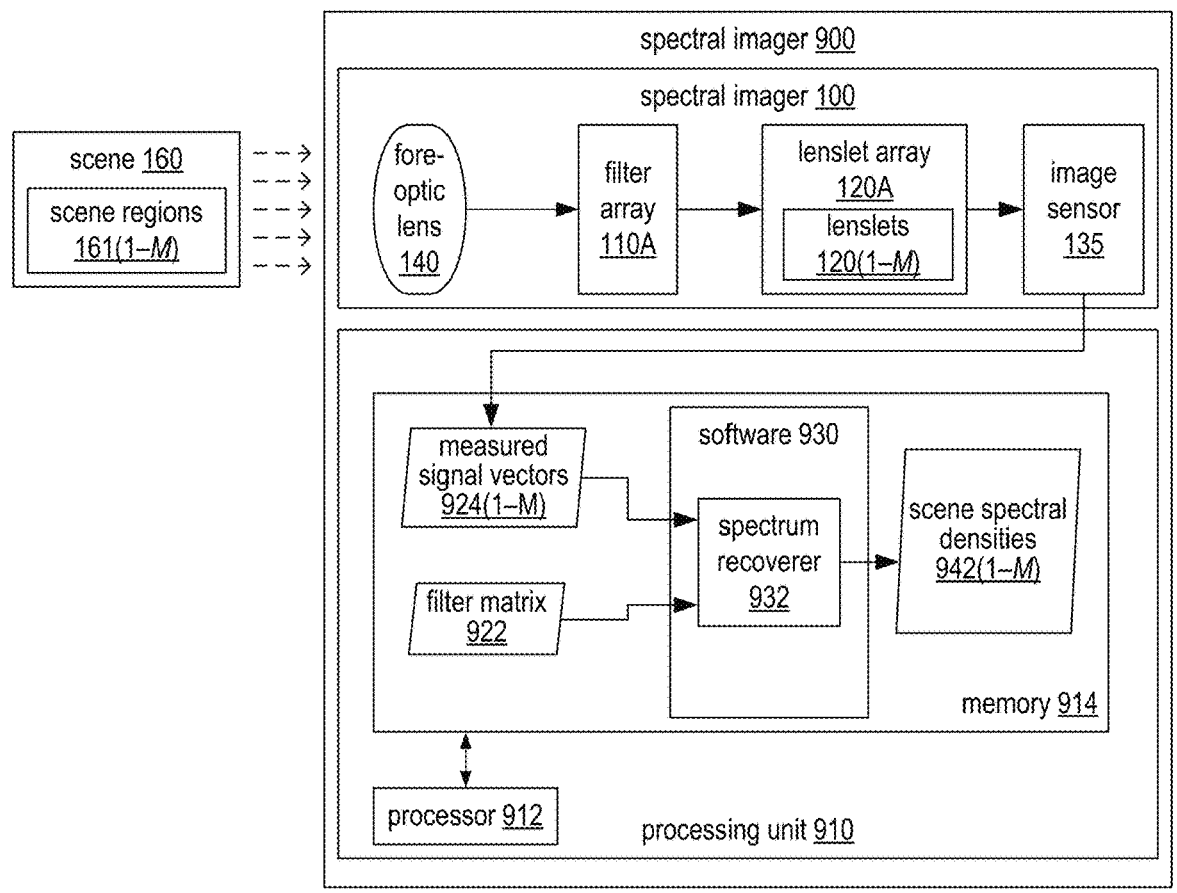
FIG. 9 is a schematic of the spectral imager of claim 1 that includes a post-processing unit, in an embodiment.

FIG. 9 is a schematic of a spectral imager 900 imaging scene 160. Spectral imager 900 includes spectral imager 100 and a post-processing unit 910. Post-processing unit 910 includes a processor 912 and a memory 914 communicatively coupled thereto.

Memory 914 represents one or both of volatile memory (e.g., RAM, DRAM, SRAM, and so on) and non-volatile or non-transitory memory such as FLASH, ROM, magnetic memory, magnetic disk, and other nonvolatile memory known in the computer art, and is illustratively shown storing software 930 implemented as machine readable instructions that are executed by processor 912 to provide the functionality of processing unit 910 as described herein. Software 930 includes a spectrum recoverer 932.

Scene 160 includes scene regions 161(1-N), where N is the number of lenslets of lenslet array 120A. Memory 914 stores filter matrix 922 and a plurality of measured signal vectors 924(1-N) each corresponding to a respective scene region 161(1-N). Filter matrix 922 is an example of filter matrix F, which has matrix elements denoted in equation (5). Each measured signal vector 924 is an example of a respective measured signal vector S, equation (4). Memory 914 also stores a plurality of recovered spectral densities 942(1-M) each corresponding to a respective scene region 161(1-N). Spectrum recoverer 932 implements equation (6) to generate each recovered spectral density 942(k) from filter matrix 922 (F in equation (3)) and measured signal vector 924(k) (S in equation (3)).

Scene spectral densities 942 may be stored as a three-dimensional data array known as a multispectral cube or hyperspectral cube, hereinafter a data cube. In a use scenario, a person skilled in the art analyzes the data cube using spectral matching methods to detect targets in scene 160 and generate a two-dimensional projection of the data cube. Examples of spectral matching methods include neural net classification, principal component analysis, and spectral angle mapping, and those described in a review article "Spectral matching approaches in hyperspectral image processing" (doi.org/10.1080/01431161.2014.980922). Processing unit 910 may execute said spectral matching algorithms. The projection may include pseudocolor imaging and/or markers to denote the targets.

FIG. 10 is a flowchart illustrating a spectral imaging method 1000. Method 1000 may be implemented within one or more aspects of spectral imager 900. In embodiments, method 1000 is implemented by processor 912 executing computer-readable instructions of software 930. Method 1000 includes steps 1010 and 1020, and may also include at least one of steps 1030 and 1040.

Step 1010 includes imaging each of a plurality of scene regions of a scene through a filter array onto a respective one of a plurality of lenslets of a lenslet array. In an example of step 1010, fore-optic 140 images scene regions 161 onto lenslet array 120A. In embodiments, step 1010 includes step 1012, which includes imaging a first scene region of the plurality of scene regions on to one of the plurality of lenslets. In an example of step 1012, fore-optic 140 images scene region 161(1) onto lenslet 220(1), FIG. 2.

The filter array includes M filter regions each having a respective transmittance spectrum $T_k(\lambda)$, k=1, 2, ... M. A first scene region of the plurality of scene regions having a spectral density $S_0=S_0(\lambda)$ where $\lambda_{min} \leq \lambda \leq \lambda_{max}$. In embodiments, $S_0=[S_0(\lambda_1), S_0(\lambda_2), \ldots, S_0(\lambda_L)]$, and L exceeds M.

Step 1020 is executed while each of the plurality of lenslets has a respective scene region imaged thereon. Step 1020 includes forming, with each of the plurality of lenslets, a respective filter-image of a plurality of filter-images of the filter array at a light-sensing surface of an image sensor. In an example of step 1020, each lenslet 220 forms a respective filter-image 510A of filter array 210A at a light-sensing surface of pixel array 130A, as shown in FIGS. 2 and 5.

Step 1030 includes storing, in a memory, a measured signal vector $S=[S_{k=1}, S_2, \ldots, S_M]$ generated by the pixel array in response to imaging the first scene region. In an example of step 1030, memory 914 stores measured signal vector 924(1) generated by image sensor 135 in response to imaging scene region 161(1).

Step 1040 includes recovering spectral density $S_0$ by multiplying the measured signal vector S by an inverse of a filter matrix F having matrix elements $F_{j,k}=T_k(\lambda_j)$ where $\lambda_{min} \leq \lambda_j \leq \lambda_{max}$. In an example of step 1040, spectrum recoverer 932 recovers recovered spectral density 942(1) by multiplying measured signal vector 924(1) by a matrix equal to the inverse of filter matrix 922. In embodiments, filter matrix F has L rows and L exceeds M, such that step 1040 yields a recovered spectral density $F^{-1} \cdot S$ that includes L recovered spectral density values.

Figure 11:
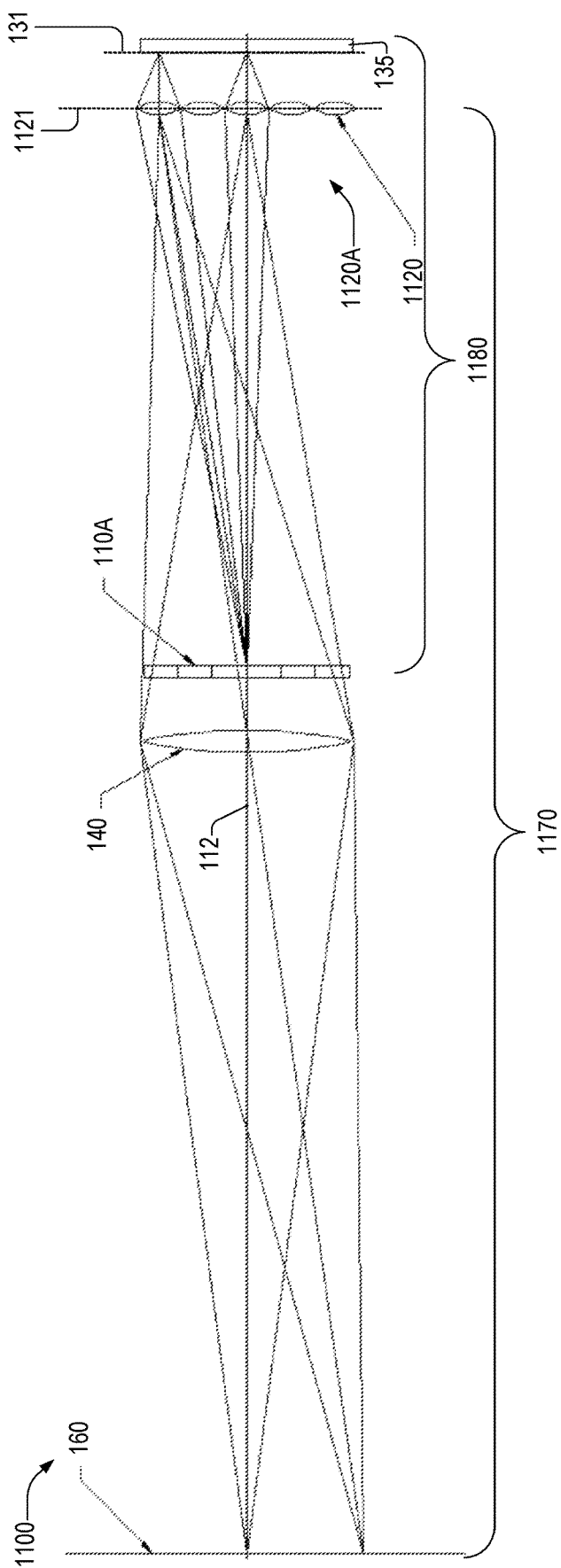
FIG. 11 is a ray trace through a fore-optic imaging system and a lenslet imaging system of a spectral imager, which is an embodiment of spectral imager FIG. 1.
Figure 12:
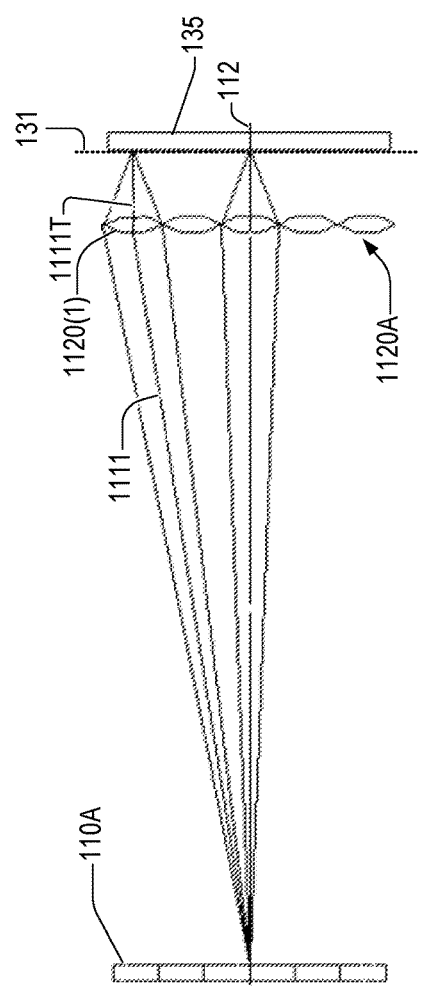
FIG. 12 depicts lenslet imaging system FIG. 12 in additional detail.

FIG. 11 is a ray trace through a fore-optic imaging system 1170 and a lenslet imaging system 1180 of a spectral imager 1100, which is an example of spectral imager 100. FIG. 12 depicts lenslet imaging system 1180. FIGS. 11 and 12 are best viewed together in the following description.

Spectral imager 1100 includes fore-optic 140, filter array 110A, lenslet array 1120A, and image sensor 135. Lenslet array 1120A is an example of lenslet array 120A, includes a plurality of lenslets 1120, and is located in an image plane 1121. Lenslets 1120 and image plane 1121 are respective example of lenslets 120 and image plane 121.

In fore-optic imaging system 1170, fore-optic 140 images scene 160 onto image plane 1121. In lenslet imaging system 1180, each lenslet 1120 of lenslet array 1120A images filter array 110A to plane 131.

In embodiments, lenslet array 1120A is configured to correct the chief-ray exit angle through each lenslet, such that each of a plurality of chief rays transmitted through a respective one of the plurality of lenslets 1120 is normally incident on image plane 131. Such chief-ray-angle-corrected lenslets register the images of each filter array 110A with a sub-array of pixels of pixel array 130A. For example, the image of each filter region 110 is imaged to a respective pixel 130 or group of adjacent contiguous pixels 130 of pixel array 130A. For example, lenslet array 1120A includes lenslet 1120(1), shown in FIG. 12. Chief ray 1111 is incident on lenslet 1120(1), which transmits chief ray 1111 and transmitted ray 1111T, which propagates parallel to axis 112.

Lenslet imaging system 1180 may achieve chief-ray angle correction by virtue of each lenslet 1120's including a beam-steering component, such as a wedge prism, that changes the direction of a light ray transmitted therethrough. From a wave-optics perspective, the beam-steering component imparts a linearly-varying phase shift on light transmitted therethrough. The beam-steering component is configured to refract the chief ray from filter array 110A incident thereon such that the chief ray transmitted through lenslet 1120 propagates parallel to optical axis 112.

Figure 13:
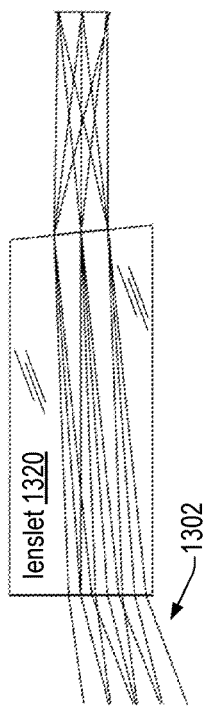
FIG. 13 is a ray trace through a beam-steering lenslet 1320, which is an example of a lenslet of FIGS. 11 and 12.

The beam-steering component may be integrated into lenslet 1120. For example, FIG. 13 is a ray trace through a beam-steering lenslet 1320, which is an example of lenslet 1120(1). Off-axis lenslet 1320 both focuses and steers illumination 1302 propagating therethrough. Beam-steering lenslet 1320 may include a graded-index medium.

In embodiments, the beam-steering component also serves to align, or register, each image of filter array 110A to a respective sub-array of pixels of pixel array 130. A pixel sub-array is, for example, an m-by-n array of pixels within pixel array 130, where m and n are positive integers.

A second means to register images of filter array 110A to a pixel sub-array is to laterally offset one or more off-axis lenslets 120. In embodiments, the optical axis of off-axis lenslets 120—those not intersected by optical axis 112—are laterally offset. In embodiments, lenslet array 120 includes a first lenslet 120 a near edge, a lenslet optical axis, and a far edge located at respective radial distances $R_1$, $R_a$, and $R_2$ from optical axis 112 of fore-optic 140. Radial distance $R_a$ is less than $(R_1+R_2)/2$ such that the lenslet optical axis is decentered from the center of lenslet 120 by an amount that is an increasing function of $R_1$.

Figure 14:
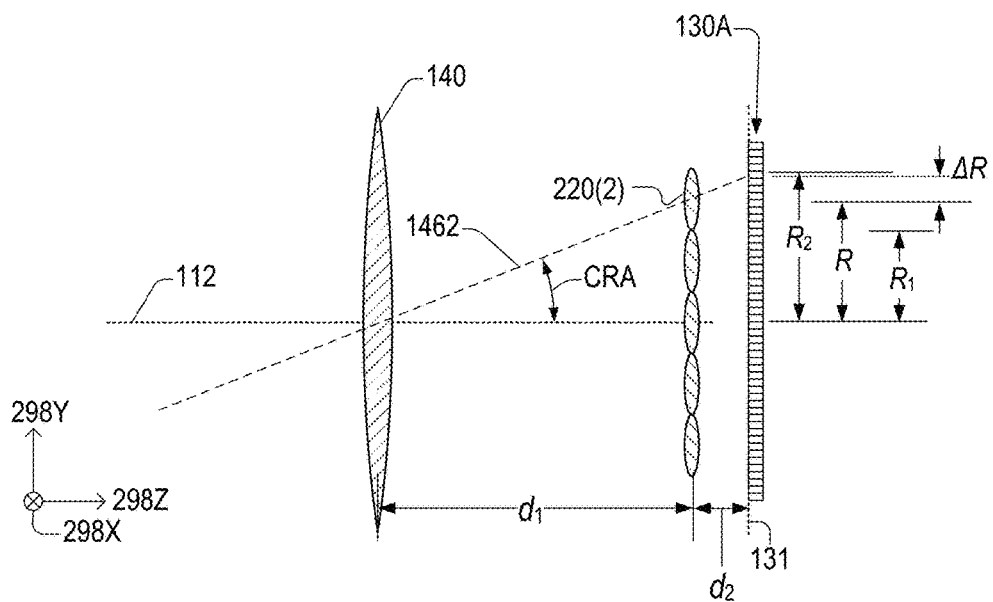
FIG. 14 illustrates radial offset of an off-axis lenslet, in an embodiment of the spectral imager of FIG. 1.

FIG. 14 illustrates a chief ray 1462 propagating through respective centers of fore-optic 140 and a lenslet 220(2). Lenslet 220(2) is between radial distances $R_1$ and $R_2$ from optical axis 112. The optical axis of lenslet 220(2) is located at a radial distance R from optical axis 112 and an axial distance $d_2$ from sensor plane 131. Fore-optic 140 and lenslet array 220A are separated by an axial distance $d_1$, such that the chief-ray angle CRA of chief ray 1462 equals $\arctan(R/d_1)$. Chief ray 1462 reaches sensor plane 131 at a radial distance $R+\Delta R$, such that chief-ray angle CRA also equals $\arctan(\Delta R/d_2)$ and hence $\Delta R=Rd_2/d_1$. To compensate for offset $\Delta R$, the optical axis of lenslet 220(2) may be radially offset by $-\Delta R$ (toward optical axis 112) while lenslet 220(2) remains between radial distances $R_1$ and $R_2$ from optical axis 112.

Figure 15:
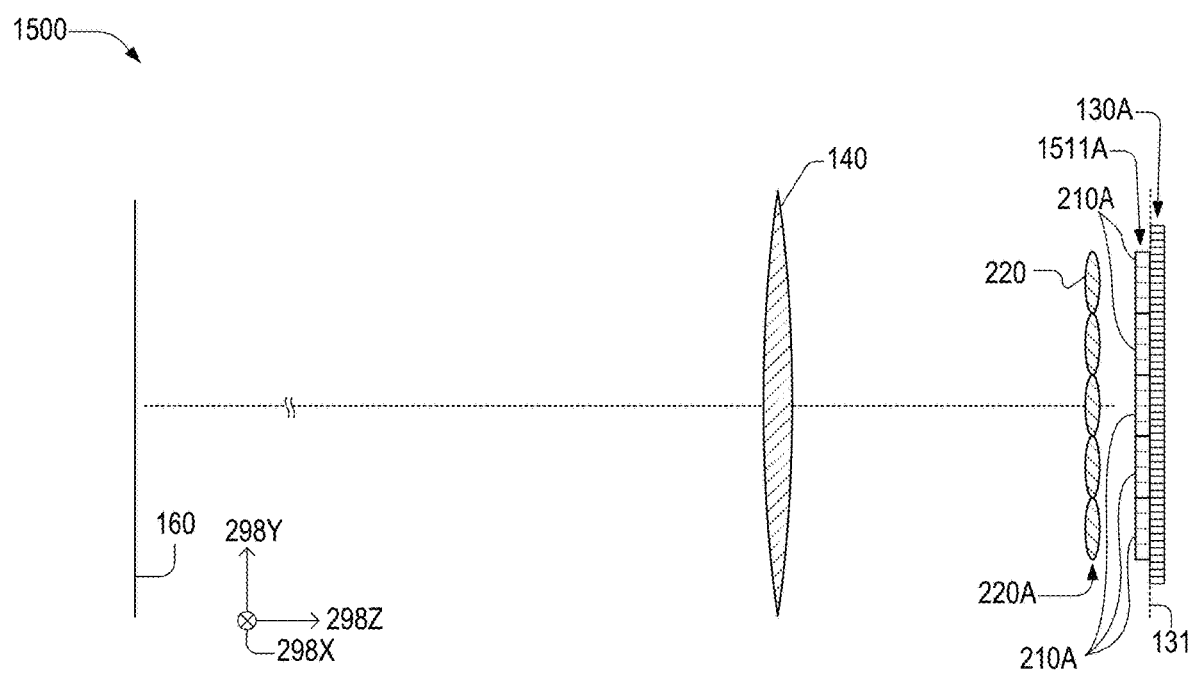
FIG. 15 is a schematic cross-sectional view of a spectral imager, which is an example of the spectral imager of FIG. 2 with its filter array adjacent to a sensor plane.

FIG. 15 is a schematic cross-sectional view of a spectral imager 1500, which is an example of spectral imager 200. Spectral imager 1500 is equivalent to spectral imager 200 with a super-array 1511A replacing filter array 210A, and located between lenslet array 220A and pixel array 130A. Whereas spectral imager 200 images a filter array 220A onto sensor plane 131 as tiled image 500, spectral image 1500 includes super-array 1511A at sensor plane 131.

In embodiments, super-array 1511A includes a plurality of filter arrays 210A each registered with a respective lenslet 220A in transverse directions 298X and 298Y. In embodiments, each filter 210 of each filter array 210A is aligned with a respective pixel 130 of pixel array 130A. In embodiments, super-array 1511A includes at least one wedged etalon, as described in an embodiment of filter array 110A. In embodiments, super-array 1511A includes a multi-layer interference filter that has a non-uniform total thickness, as described in an embodiment of filter array 110A In embodiments, a center of each filter array 210A of super-array 1511A is transversely aligned with a respective lenslet 220 of lenslet array 220. In embodiments, spectral imager 1500 lacks lenslet array 220A.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A spectral imager comprising:
   a filter array, a pixel array, and a lenslet array therebetween;
   the filter array including a plurality of filter regions each having a respective transmittance as a function of at least one of electromagnetic wavelength and polarization;
   and
   the lenslet array including a plurality of lenslets each configured to form a respective filter-array image of the filter array on a respective one of a plurality of regions of the pixel array,
   the filter array having a filter-array pitch W in a first direction, the pixel array including a plurality of pixels spaced by a pixel pitch P in the first direction, each respective filter-array image having a magnification M such that $P<M\times W$.

2. The spectral imager of claim 1, further comprising a fore-optic lens configured to form an image of a scene on the lenslet array, the filter array being located within a focal length of the fore-optic lens along an optical axis of the fore-optic lens.

3. The spectral imager of claim 2, the filter array being located at an aperture stop of an imaging system formed by the fore-optic lens, the lenslet array, and the pixel array.

4. The spectral imager of claim 3, the fore-optic lens being between the filter array and the lenslet array.

5. The spectral imager of claim 2, further comprising:
   a cold shield enclosing the lenslet array and the pixel array and having a cold stop functioning as an aperture stop of an imaging system formed by the fore-optic lens, the lenslet array, and the pixel array.

6. The spectral imager of claim 5, the filter array being located within the cold stop.

7. The spectral imager of claim 2, the plurality of lenslets including a first lenslet having a near edge, a lenslet optical axis, and a far edge located at respective radial distances $R_1$, $R_a$, and $R_2$ from an optical axis of the fore-optic, wherein radial distance $R_a$ is less than $(R_1+R_2)/2$ such that the lenslet optical axis is decentered from the center of its aperture by an amount that is an increasing function of $R_1$.

8. The spectral imager of claim 1, each lenslet of the plurality of lenslets having a width less than or equal to a transverse dimension of the respective filter-array image formed by the lenslet.

9. The spectral imager of claim 1, each of the plurality of filter regions having a respective transmittance spectrum that exceeds a threshold transmittance in a wavelength range, in which at a minimum transmittance of least one other filter region of the plurality of filter regions exceeds the threshold transmittance in the wavelength range.

10. The spectral imager of claim 1, each of the plurality of filter regions having a respective passband at electromagnetic wavelengths between seven micrometers and 12.5 micrometers.

11. The spectral imager of claim 1, each of the plurality of filter regions including part of a metasurface.

12. The spectral imager of claim 1, each of the plurality of filter regions including part of a wedged etalon.

13. The spectral imager of claim 1, each of the plurality of filter regions including part of a same multilayer interference filter that has a spatially-varying spectral transmission.

14. The spectral imager of claim 1, each of the plurality of filter regions including a polarizer.

15. The spectral imager of claim 1, the filter array including M filter regions each having a respective transmittance spectrum $T_k(\lambda)$, k=1, 2, . . . M; and further comprising:
  an image sensor that includes the pixel array;
  a processor communicatively coupled to the image sensor; and
  a memory adapted to store non-transitory computer-readable instructions that, when executed by the processor, control the processor to:
  store, in the memory, a measured signal vector $S=[S_{k=1}, S_2, \ldots, S_M]$ generated by the image sensor in response to imaging a first scene region having a spectral density $S_0=S_0(\lambda)$ where $\lambda_{min} \leq \lambda \leq \lambda_{max}$; and
  recover spectral density $S_0$ by multiplying the measured signal vector S by an inverse of a filter matrix F having matrix elements $F_{j,k}=T_k(\lambda_j)$ where $\lambda_{min} \leq \lambda_j \leq \lambda_{max}$.

16. A spectral imaging method comprising:
  imaging each of a plurality of scene regions of a scene through a filter array and onto a respective one of a plurality of lenslets of a lenslet array, the filter array including M filter regions each having a respective transmittance spectrum $T_k(\lambda)$, k=1, 2, . . . M, a first scene region of the plurality of scene regions having a spectral density $S_0=S_0(\lambda)$ where $\lambda_{min} \leq \lambda \leq \lambda_{max}$;
  forming, with each of the plurality of lenslets, a respective filter-image of a plurality of filter-images of the filter array at an electromagnetic-radiation-sensing surface of an image sensor;
  storing, in a memory, a measured signal vector $S=[S_{k=1}, S_2, \ldots, S_M]$ generated by the image sensor in response to imaging the first scene region; and
  recovering spectral density $S_0$ by multiplying the measured signal vector S by an inverse of a filter matrix F having matrix elements $F_{j,k}=T_k(\lambda_j)$ where $\lambda_{min} \leq \lambda_j \leq \lambda_{max}$.

17. The method of claim 16, in the step of recovering, filter matrix F having L rows and L exceeds M, such that recovering yields a recovered spectral density $F^{-1} \cdot S$ that includes L recovered spectral density values.

18. A spectral imager comprising:
  a filter array, an image sensor, and a lenslet array therebetween; and
  a fore-optic lens configured to form an image of a scene on the lenslet array, the filter array being located within a focal length of the fore-optic lens along an optical axis of the fore-optic lens;
  the filter array including a plurality M filter regions each having a respective transmittance spectrum $T_k(\lambda)$, k=1, 2, . . . M, where $\lambda$ is an electromagnetic wavelength;
  the lenslet array including a plurality of lenslets each configured to form a respective filter-array image of the filter array on a respective one of a plurality of regions of the pixel array;
  the plurality of lenslets including a first lenslet having a near edge, a lenslet optical axis, and a far edge located at respective radial distances $R_1$, $R_a$, and $R_2$ from an optical axis of the fore-optic, wherein radial distance $R_a$ is less than $(R_1+R_2)/2$ such that the lenslet optical axis is decentered from the center of its aperture by an amount that is an increasing function of $R_1$.

19. A spectral imager comprising:
  a filter array, an image sensor, and a lenslet array therebetween;
  the filter array including a plurality M filter regions each having a respective transmittance spectrum $T_k(\lambda)$, k=1, 2, . . . M, where A is an electromagnetic wavelength;
  the lenslet array including a plurality of lenslets each configured to form a respective filter-array image of the filter array on a respective one of a plurality of regions of the pixel array;
  a processor communicatively coupled to the image sensor; and
  a memory adapted to store non-transitory computer-readable instructions that, when executed by the processor, control the processor to:
  store, in the memory, a measured signal vector $S=[S_{k=1}, S_2, S_M]$ generated by the image sensor in response to imaging a first scene region having a spectral density $S_0=S_0(\lambda)$ where $\lambda_{min} \leq \lambda \leq \lambda_{max}$; and
  recover spectral density $S_o$ by multiplying the measured signal vector S by an inverse of a filter matrix F having matrix elements $F_{j,k}=T_k(\lambda_j)$ where $\lambda_{min} \leq \lambda_j \leq \lambda_{max}$.

* * * * *